No. 766,453. PATENTED AUG. 2, 1904.
W. F. J. LUTZ.
JOINT FOR CONNECTING SOIL AND SEWER PIPES.
APPLICATION FILED DEC. 7, 1903.
NO MODEL.

Witnesses:

Inventor:
William F. J. Lutz
by Poole & Brown
his Attys

No. 766,453. Patented August 2, 1904.

UNITED STATES PATENT OFFICE.

WILLIAM FRED JOHN LUTZ, OF CHICAGO, ILLINOIS.

JOINT FOR CONNECTING SOIL AND SEWER PIPES.

SPECIFICATION forming part of Letters Patent No. 766,453, dated August 2, 1904.

Application filed December 7, 1903. Serial No. 184,208. (No model.)

*To all whom it may concern:*

Be it known that I, WILLIAM FRED JOHN LUTZ, a citizen of the United States, and a resident of Chicago, in the county of Cook and State of Illinois, have invented certain new and useful Improvements in Joints for Connecting Soil and Sewer Pipes; and I do hereby declare that the following is a full, clear, and exact description thereof, reference being had to the accompanying drawings, and to the letters of reference marked thereon, which form a part of this specification.

This invention relates to improvements in connections or joints between soil-pipes of buildings and sewer-pipes or branches leading to sewers of that class in which the soil-pipe is adapted to slightly shift or slide endwise with respect to the sewer-pipe.

The object of the invention is to simplify the construction of such joints, make them more compact, and to cheapen their cost.

The invention consists in the matters hereinafter set forth, and more particularly pointed out in the appended claims.

Figure 1:
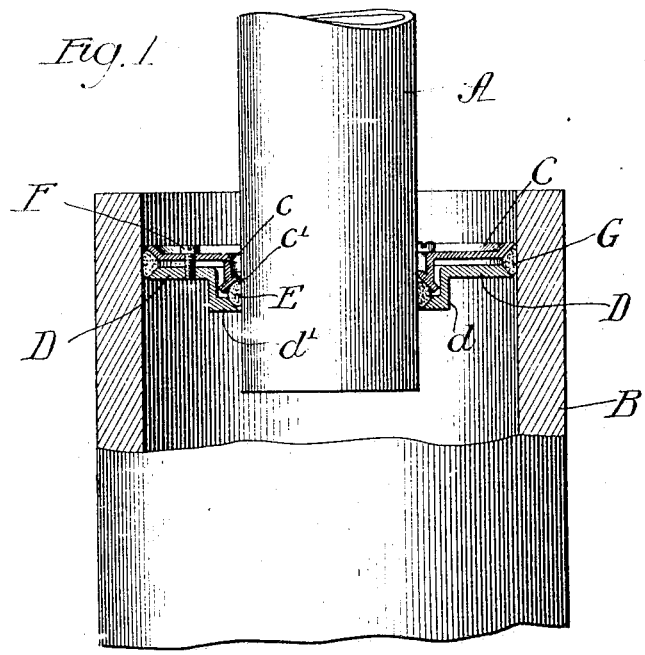
Figure 2:
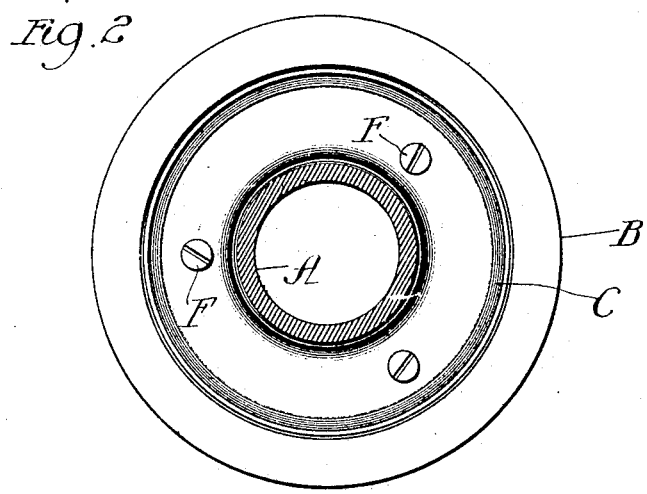

In the drawings, Figure 1 is a vertical section taken through the adjacent ends of a soil and sewer pipe, showing my improved joint for connecting the same. Fig. 2 is a cross-section taken through the soil-pipe above the sewer-pipe and looking down.

As shown in the drawings, A designates as a whole the lower end of a soil-pipe, and B the upper or adjacent end of a sewer-pipe, which is herein shown as made plain ended or without an end flange or hub. Said soil-pipe is made smaller than the sewer-pipe and extends a distance thereinto.

My improved joint surrounds the soil-pipe and is contained wholly within the sewer-pipe. The joint consists of two horizontal upper and lower ring-like members C and D, which are provided with central openings to permit the soil-pipe to pass freely therethrough. Said rings are made of such size as to fit closely at their outer margins within the sewer-pipe, and a packing device is interposed between the outer margins thereof and the inner cylindric surface of the sewer-pipe, as will hereinafter appear, which not only prevents the escape of gas between said parts, but also frictionally holds the joint in place in said sewer-pipe. The lower ring D is provided at its inner margin with a depending flange $d$, which in turn is provided at its lower end with an annular inturned radial flange $d'$, and said lateral flange is preferably tapered on its upper surface and constitutes a seat for an annular yielding packing-gasket E. The upper packing-ring C is provided at its inner margin with a cylindric flange $c$, which extends downwardly into the space surrounded by the flange $d$ of the ring D, and said flange $c$ is provided with an inclined lower end $c'$, which bears downwardly against the packing gasket E, that rests on the flange $d'$ of the lower ring D. The said gasket E rests against the exterior cylindric surface of the soil-pipe, and the angles of the flanges $d'$ and $c'$ are such that when the gasket is compressed between the same by movement of one of the rings toward the other the gasket is forced outwardly against said soil-pipe, thereby affording a gas-tight joint between the rings and said pipe. The devices at the outer margin of the rings for making a tight joint between the rings and the sewer-pipe consist of an annular yielding packing-gasket G, which fits against the inner cylindric surface of the sewer-pipe and is interposed between the margins of the packing-rings C D. The margins of said packing-rings are oppositely inclined, as shown in Fig. 1, thereby affording the space required for the reception of said gasket. By reason of the opposing inclination of said margins of the rings when said rings are forced together said packing-gasket is not only compressed between the packing-rings, but is forced outwardly against the inner cylindric surface of the sewer-pipe, thereby affording a tight joint between said parts.

The packing-rings are pressed together to compress the gaskets E and G by means of top bolts F, extending freely through openings in the upper ring C and having screw-threaded engagement with openings in the lower ring D, the bolts acting when turned downwardly to force the rings together. Other means may be employed for pressing the rings together and compressing the gaskets E and G.

The joint described has the advantage of consisting of but few parts, which are exceedingly simple in their construction, whereby the cost of the joint is reduced to a minimum. Ample provisions are provided, however, for maintaining the integrity of the joint between the packing-rings and the sewer and soil pipes, respectively, and the frictional contact at the outer packing-gasket with the sewer-pipe is sufficient to frictionally hold the device in place and prevent the same slipping upwardly and downwardly in the sewer-pipe. Moreover, there are no parts projecting outwardly from the sewer-pipe which are likely to become broken or the adjustment thereof disturbed, as is common with joints of this character now in use.

I claim as my invention—

1. The combination with a sewer-pipe and a soil-pipe which enters the sewer-pipe, of outer and inner packing-rings surrounding the soil-pipe and contained wholly within the sewer-pipe, and means for effecting gas-tight joints between the inner margins of said rings and the soil-pipe and between the outer margins thereof and the sewer-pipe.

2. The combination with a sewer-pipe and a soil-pipe which enters the sewer-pipe, of outer and inner continuous packing-rings surrounding the soil-pipe and contained wholly within the sewer-pipe, means for effecting gas-tight joints between the inner margins of said rings and the soil-pipe and between the outer margins thereof and the sewer-pipe, the joint between the outer margins of said rings and the sewer-pipe being constructed to hold the said rings in place.

3. The combination with a sewer-pipe and a soil-pipe which enters the sewer-pipe, of outer and inner continuous packing-rings surrounding the soil-pipe and contained wholly within the sewer-pipe, the adjacent sides of said packing-rings being oppositely inclined at their inner margins, a gasket interposed between said inclined margins of the rings and bearing against the soil-pipe, means for forcing said rings together, and means for providing a gas-tight joint between the outer margins of said rings and the sewer-pipe.

4. The combination with a sewer-pipe and a soil-pipe which enters the sewer-pipe, of outer and inner continuous packing-rings surrounding the soil-pipe and contained wholly within the sewer-pipe, the adjacent sides of said rings being oppositely inclined at their outer margins, a packing-gasket interposed between said inclined outer margins of the packing-rings and bearing against the inner cylindric surface of the sewer-pipe, means for forcing said rings together, and means for providing a gas-tight joint between the inner margins of the ring and the soil-pipe.

5. The combination with a sewer-pipe and a soil-pipe which enters the sewer-pipe, of outer and inner continuous packing-rings surrounding the soil-pipe and contained wholly within the sewer-pipe, said rings being provided in their adjacent faces at their outer and inner margins with oppositely-inclined faces, packing-gaskets interposed between said inclined faces at the inner and outer margins of the ring and bearing against the soil-pipe and sewer-pipe, respectively, and means for forcing said rings together.

6. A joint for the purpose set forth comprising two flat rings arranged in parallel planes, said rings being provided in their adjacent faces at their inner and outer margins with oppositely-inclined faces, packing-gaskets interposed between said inclined faces, and means for forcing said rings together.

7. A joint for the purpose set forth comprising two continuous rings provided on the adjacent faces of their outer margins with oppositely-inclined faces, a yielding gasket interposed between said faces, a cylindric flange on the inner margin of one of said rings having an inclined face, a cylindric flange on the other ring adapted to enter the space surrounded by the other flange and provided with an inclined face opposing said inclined face of said other flange, a gasket interposed between said inclined faces of said flanges, and means for forcing said rings together.

In testimony that I claim the foregoing as my invention I affix my signature, in presence of two witnesses, this 4th day of December, A. D. 1903.

WILLIAM FRED JOHN LUTZ.

Witnesses:
C. TIEDEMAN,
A. TIEDEMAN.